US010530173B2

(12) United States Patent
Sun et al.

(10) Patent No.: US 10,530,173 B2
(45) Date of Patent: Jan. 7, 2020

(54) CHARGING DEVICE AND CONTROL METHOD THEREFOR

(71) Applicant: Delta Electronics (Shanghai) Co., Ltd., Shanghai (CN)

(72) Inventors: Hao Sun, Shanghai (CN); Minli Jia, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 10 days.

(21) Appl. No.: 16/122,395

(22) Filed: Sep. 5, 2018

(65) Prior Publication Data

US 2019/0089182 A1 Mar. 21, 2019

(30) Foreign Application Priority Data

Sep. 21, 2017 (CN) .......................... 2017 1 0859643
Jan. 15, 2018 (CN) .......................... 2018 1 0036347

(51) Int. Cl.
*H02J 7/00* (2006.01)
*H02J 7/02* (2016.01)
*H02J 5/00* (2016.01)
*H02M 7/162* (2006.01)
*H02M 7/17* (2006.01)
(Continued)

(52) U.S. Cl.
CPC .............. *H02J 7/022* (2013.01); *B60L 53/14* (2019.02); *B60L 53/22* (2019.02); *H02J 5/00* (2013.01); *H02J 7/0045* (2013.01); *H02M 1/10* (2013.01); *H02M 7/162* (2013.01); *H02M 7/17* (2013.01); *B60L 2210/30* (2013.01);
(Continued)

(58) Field of Classification Search
CPC . H02J 7/022; H02J 7/0045; H02J 5/00; B60L 53/22; B60L 53/14; B60L 2210/30; H02M 1/10; H02M 1/4208; H02M 1/4233; H02M 7/162; H02M 7/17; H02M 7/5388
USPC .......................................................... 320/107
See application file for complete search history.

(56) References Cited

U.S. PATENT DOCUMENTS 3,936,723 A 2/1976 Harris
2011/0080693 A1* 4/2011 Tsai ........................ G06F 1/189
361/634
(Continued)

FOREIGN PATENT DOCUMENTS

CN 203180622 U 9/2013
EP 2869445 A1 5/2015
JP 2000324704 A 11/2000

*Primary Examiner* — Nathaniel R Pelton
(74) *Attorney, Agent, or Firm* — Kirton McConkie; Evan R. Witt

(57) ABSTRACT

A charging device includes a first auxiliary bridge arm and a second auxiliary bridge arm. The first auxiliary bridge arm is connected between a first port and a second module. The second auxiliary bridge arm is connected between the first port and a third module. If the AC charging power is three-phase, the first module converts a first phase of the AC charging power, and the first auxiliary bridge arm and the second auxiliary bridge arm are disabled. Consequently, the second module converts a second phase of the AC charging power, and the third module converts a third phase of the AC charging power. If the AC charging power is single-phase, at least a first module is used to convert the AC charging power.

21 Claims, 7 Drawing Sheets

(51) Int. Cl.
*B60L 53/14* (2019.01)
*B60L 53/22* (2019.01)
*H02M 1/10* (2006.01)
*H02M 1/42* (2007.01)
*H02M 1/00* (2006.01)
*H02M 7/5388* (2007.01)

(52) U.S. Cl.
CPC ........ *H02M 1/4208* (2013.01); *H02M 1/4233* (2013.01); *H02M 7/5388* (2013.01); *H02M 2001/007* (2013.01)

(56) References Cited

U.S. PATENT DOCUMENTS

| | | | |
|---|---|---|---|
| 2012/0212984 A1* | 8/2012 | Yamada | H02M 7/219 363/89 |
| 2015/0123612 A1* | 5/2015 | Ide | H02M 1/10 320/109 |
| 2019/0036462 A1* | 1/2019 | Tazaki | H02M 1/32 |

* cited by examiner

CHARGING DEVICE AND CONTROL METHOD THEREFOR

FIELD OF THE INVENTION

The present invention relates to a charging device, and more particularly to a charging device for an electric vehicle and a control method therefor.

BACKGROUND OF THE INVENTION

With increasing environmental consciousness, electric vehicles are gradually employed. Moreover, the electric vehicle is usually equipped with a charging device to charge the storage batteries of the electric vehicle. According to the type of the input power source, the charging device of the electric vehicle is classified into two types, i.e., a single-phase charging device and a three-phase charging device. The output power of the single-phase charging device is usually 3.6 kW or 7.2 kW. The output power of the three-phase charging device is usually 10 kW. As the endurance power of the electric vehicle is gradually increased, the level of the output power is also increased. Consequently, the high-power charging device is the mainstream of the market.

However, the conventional three-phase charging device is only able to receive the three-phase input power source to perform the charging operation. In case that the input power source of the charging station is the single-phase input power source, the charging operation cannot be performed on the electric vehicle. For solving this drawback, the electric vehicle with the three-phase charging device is equipped with a single-phase portable charger to provide the single-phase input power source to the three-phase charging device. However, the use of the single-phase portable charger reduces the electric safety and increases the cost.

As mentioned above, the conventional three-phase charging device uses the single-phase portable charger to receive the single-phase input power source. Generally, the three-phase charging device comprises three modules to convert the corresponding single-phase power of the three-phase input power source. While the three-phase charging device receives the single-phase power, only one module of the three-phase charging device is enabled. However, since the level of the output power from the single module is limited, the level of the output power is possibly unable to meet the practical requirements. For example, if the current of the input power is increased, the level of the output power is not correspondingly increased. In other words, the output power of the conventional three-phase charging device is limited.

Therefore, there is a need of providing an improved charging device and control method therefor in order to overcome the above drawbacks.

SUMMARY OF THE INVENTION

An object of the present invention provides a charging device capable of receiving the single-phase power source or the three-phase power source to perform the charging operation. Consequently, the drawbacks of the conventional technologies are overcome.

In accordance with an aspect of the present invention, there is provided a charging device. The charging device receives an AC charging power from a charging apparatus and converts the AC charging power to a load. The charging device includes a charging terminal, a first module, a second module, a third module, a first auxiliary bridge arm, a second auxiliary bridge arm and a communication module. The charging terminal includes a first port, a second port, a third port, a neutral line port and a communication port. If the AC charging power is single-phase, the charging terminal receives the AC charging power through the first port and the neutral line port. If the AC charging power is three-phase, the charging terminal receives a first phase, a second phase and a third phase of the AC charging power through the first port, the second port and the third port, respectively. The first module is connected with the first port and the neutral line port. The second module is connected with the second port and the neutral line port. The third module is connected with the third port and the neutral line port. An output terminal of the first module, an output terminal of the second module and an output terminal of the third module are connected with each other. The first module, the second module and the third module judge whether the AC charging power is single-phase or three-phase. The first auxiliary bridge arm is connected between the first port and the second module. The second auxiliary bridge arm is connected between the first port and the third module. The communication module is connected to the charging terminal, the first module, the second module and the third module. The communication module is used for receiving a charging signal of the AC charging power and transmitting an information about the charging signal to the first module, the second module and the third module. According to the charging signal, the second module and the third module control operations of the first auxiliary bridge arm and the second auxiliary bridge arm.

In accordance with another aspect of the present invention, there is provided a control method for a charging device. The charging device receives an AC charging power from a charging apparatus and converts the AC charging power to a load. The charging device includes a charging terminal, a first module, a second module, a third module, a first auxiliary bridge arm and a second auxiliary bridge arm. The charging terminal includes a first port, a second port and a third port. The first module is connected with the first port. The second module is connected with the second port. The third module is connected with the third port. The first auxiliary bridge arm is connected between the first port and the second module. The second auxiliary bridge arm is connected between the first port and the third module. An output terminal of the first module, an output terminal of the second module and an output terminal of the third module are connected with each other. The control method includes the following steps. Firstly, a step (a) is performed to receive the AC charging power and judge whether the AC charging power is single-phase or three-phase. If the AC charging power is three-phase, a step (b) is performed. If the AC charging power is single-phase, a step (c) is performed. In the step (b), the first module converts a first phase of the AC charging power, and the first auxiliary bridge arm and the second auxiliary bridge arm are disabled. Consequently, the second module converts a second phase of the AC charging power and the third module converts a third phase of the AC charging power. In a step (c), the first module is enabled, and the first auxiliary bridge arm and the second auxiliary bridge arm are selectively enabled or disabled according to a charging signal of the AC charging power. Consequently, the second module and the third module are selectively enabled.

In accordance with a further aspect of the present invention, there is provided a control method for a charging device. The charging device receives single-phase of an AC charging power from a charging apparatus. The charging device includes a charging terminal, a first module, a second module, a third module, a first auxiliary bridge arm and a second auxiliary bridge arm. The charging terminal includes a first port and a neutral line port. The first module, the second module and the third module are connected with the first port and the neutral line port. The first auxiliary bridge arm is connected between the charging terminal and the second module. The second auxiliary bridge arm is connected between the charging terminal and the third module. An output terminal of the first module, an output terminal of the second module and an output terminal of the third module being connected with each other in parallel. The control method includes the following steps. In a step (a), first module is enabled when the charging terminal receives the AC charging power. Then, a step (b) is performed to judge whether a current value signal of the AC charging power is lower than or equal to a first current threshold value, wherein if the current value signal of the AC charging power is lower than or equal to the first current threshold value, a step (c) is performed. If the current value signal of the AC charging power is higher than the first current threshold value, a step (d) is performed. In the step (c), the first auxiliary bridge arm and the second auxiliary bridge arm are disabled, so that the second module and the third module are disabled. The step (d) is performed to judge whether the current value signal of the AC charging power is higher than the first current threshold value and the current value signal of the AC charging power is lower than or equal to a second current threshold value. If the current value signal of the AC charging power is higher than the first current threshold value and lower than or equal to the second current threshold value, a step (e) is performed. If the current value signal of the AC charging power is higher than the second current threshold value, a step (f) is performed. In the step (e), the first auxiliary bridge arm is enabled and the second auxiliary bridge arm is disabled. Consequently, the first module and the second module are connected with each other in parallel to convert the AC charging power but the third module is disabled. In a step (f), the first auxiliary bridge arm and the second auxiliary bridge arm are enabled. Consequently, the first module, the second module and the third module are connected with each other in parallel to convert the AC charging power.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
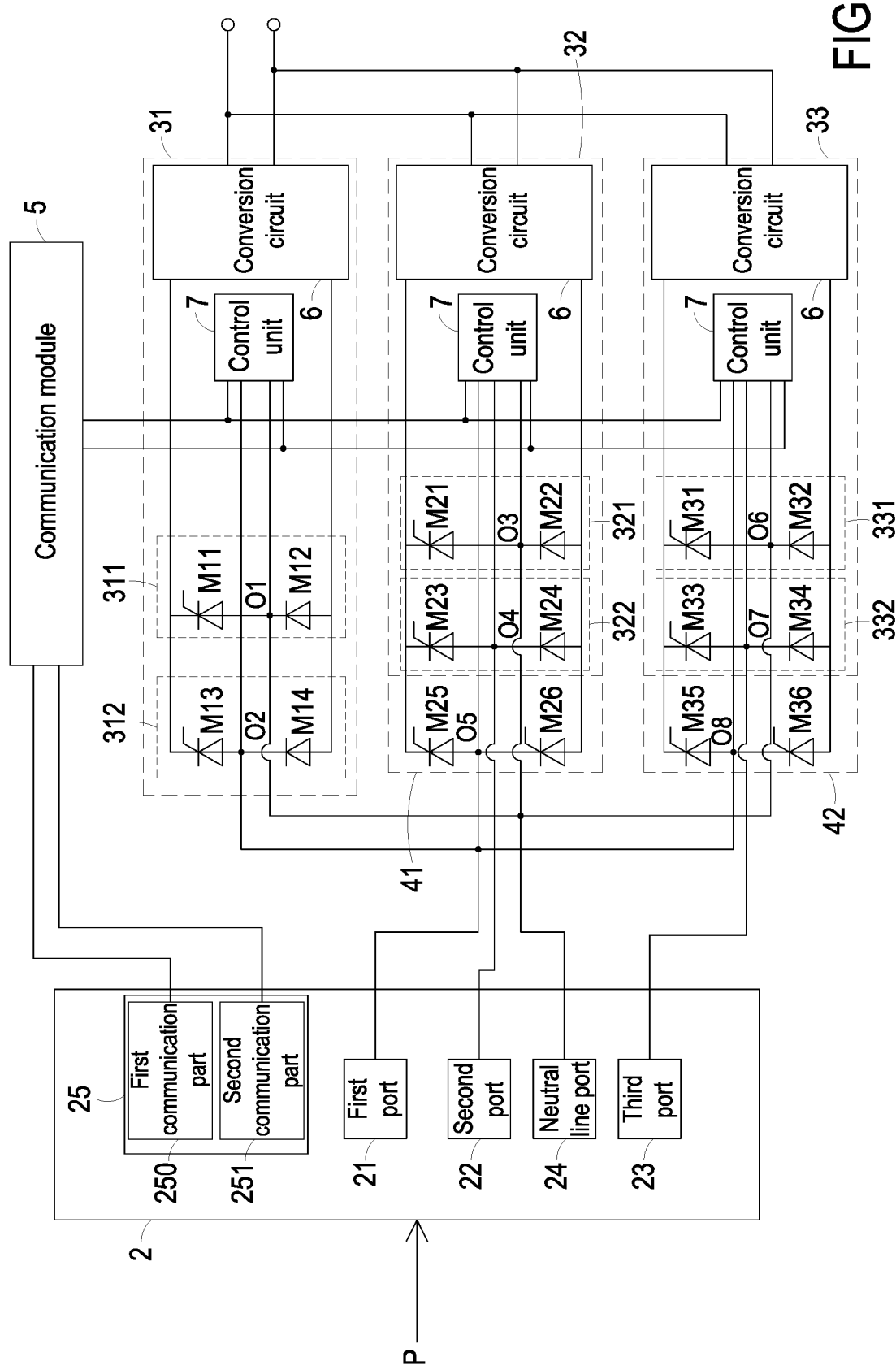
FIG. 1 is a schematic circuit diagram illustrating a charging device according to a first embodiment of the present invention.

FIG. 1 is a schematic circuit diagram illustrating a charging device according to an embodiment of the present invention. Preferably but not exclusively, the charging device 1 is applied to an electric vehicle. The charging device 1 receives an AC charging power P from a charging apparatus such as a charging station and converts the AC charging power P to a load. The charging device 1 converts the AC charging power P into an output power in order to charge a storage battery (not shown) of the electric vehicle. For example, the AC charging power P is single-phase or three-phase.

In this embodiment, the charging device 1 comprises a charging terminal 2, a first module 31, a second module 32, a third module 33, a first auxiliary bridge arm 41, a second auxiliary bridge arm 42 and a communication module 5.

The charging terminal 2 is electrically connected with an output port (e.g., a charging gun) of the charging apparatus to receive the AC charging power P from the charging apparatus. In an embodiment, the charging terminal 2 comprises a first port 21, a second port 22, a third port 23, a neutral line port 24 and a communication port 25. In case that the AC charging power P is single-phase, the charging terminal 2 receives the AC charging power P through the first port 21 and the neutral line port 24. In case that the AC charging power P is three-phase, the charging terminal 2 receives corresponding phase power of the AC charging power P through the first port 21, the second port 22 and the third port 23, respectively. The communication port 25 is used for transmitting a charging signal of the AC charging power P. The communication module 5 is connected to the charging terminal 2. The communication module 5 is used for confirming the charging signal of the AC charging power P. In some embodiments, the charging signal comprises a current valve signal. In some embodiments, the neutral line port 24 of the charging terminal 2 is connected with the output port of the charging apparatus through a neutral line (not shown). In some embodiments, the neutral line port 24 of the charging terminal 2 is not connected with the output port of the charging apparatus.

The first module 31 is connected with the first port 21 and the neutral line port 24. During operation, the first module 31 converts the received power. The second module 32 is connected with the second port 22 and the neutral line port 24. During operation, the second module 32 converts the received power. The third module 33 is connected with the third port 23 and the neutral line port 24. During operation, the third module 33 converts the received power. The output terminals of the first module 31, the second module 32 and the third module 33 are connected with the storage battery of the electric vehicle in parallel. Moreover, the first module 31, the second module 32 and the third module 33 can confirm whether the AC charging power P is single-phase or three-phase respectively. In an embodiment, the first module 31, the second module 32 and the third module 33 are single-phase converters, respectively. Regardless of whether the AC charging power P is single-phase or three-phase, the first module 31 is always enabled to convert the received power. Preferably but not exclusively, the levels of the output power from the first module 31, the second module 32 and the third module 33 are 3.6 kW.

The first auxiliary bridge arm 41 is connected between the first port 21 and the second module 32. The second auxiliary bridge arm 42 is connected between the first port 21 and the third module 33. The communication module 5 is connected with the communication port 25. That is, the communication module 5 is in communication with the communication port 25 to confirm the current value signal of the AC charging power P. Moreover, the communication module 5 is connected with the first module 31, the second module 32 and the third module 33. Consequently, the information about the current value signal of the AC charging power P is transmitted from the communication module 5 to the first module 31, the second module 32 and the third module 33. According to the current value signal of the AC charging power P, the second module 32 and the third module 33 control the operations of the first auxiliary bridge arm 41 and the second auxiliary bridge arm 42, respectively.

In this embodiment, the output terminals of the first module 31, the second module 32 and the third module 33 are connected with each other in parallel.

In case that the AC charging power P received through the first port 21, the second port 22 and the third port 23 of the charging terminal 2 is three-phase, the operations of the charging device 1 will be described as follows.

The AC charging power P is transmitted from the first port 21 to the first module 31, the first module 31 converts the first phase of the AC charging power. Meanwhile, the first module 31, the second module 32 and the third module 33 judges that the AC charging power P is three-phase, the first auxiliary bridge arm 41 is disabled by the second module 32 and the second auxiliary bridge arm 42 is disabled by the third module 33. Since the first auxiliary bridge arm 41 is disabled, the second phase of the AC charging power cannot be transmitted from the first port 21 to the first auxiliary bridge arm 41. However, the second phase of the AC charging power is transmitted to the second module 32. The AC charging power P is transmitted from the second port 22 to the second module 32, the second module 32 converts the second phase of the AC charging power. Since the second auxiliary bridge arm 42 is disabled, the third phase of the AC charging power cannot be transmitted from the first port 21 to the second auxiliary bridge arm 42. However, the third phase of the AC charging power is transmitted to the third module 33. After the AC charging power P is transmitted from the third port 23 to the third module 33, the third module 33 converts the third phase of the AC charging power.

In case that the AC charging power P received through the first port 21 and the neutral line port 24 of the charging terminal 2 is single-phase and the output terminals of the first module 31, the second module 32 and the third module 33 are connected with each other in parallel, the operations of the charging device 1 will be described as follows.

If the current value signal of the AC charging power P is lower than or equal to a first current threshold value (e.g., 16 A), the first auxiliary bridge arm 41 and the second auxiliary bridge arm 42 are disabled by the second module 32 and the third module 33, respectively. Meanwhile, the first module 31 converts the received power, but the second module 32 and the third module 33 do not convert the received power.

After the AC charging power P is received by the first module 31 through the first port 21 and the neutral line port 24, the AC charging power P is converted so as to charge the storage battery. Moreover, the level of the output power from the charging device 1 may be increased according to the practical requirements. When the first module 31, the second module 32 and the third module 33 judges that the AC charging power P is single-phase and the communication module 5 realizes the current value signal of the AC charging power P, the information about the current value signal of the AC charging power P is transmitted from the communication module 5 to the first module 31, the second module 32 and the third module 33. According to the current value signal of the AC charging power P, the second module 32 and the third module 33 control the operations of the first auxiliary bridge arm 41 and the second auxiliary bridge arm 42, respectively. Since the second module 32 and the third module 33 selectively convert the received power, the level of the output power from the charging device 1 is varied.

If the current value signal of the AC charging power P is higher than the first current threshold value (e.g., 16 A) and lower than or equal to a second current threshold value (e.g., 32 A), the first auxiliary bridge arm 41 is enabled by the second module 32 and the second auxiliary bridge arm 42 is disabled by the third module 33. Meanwhile, the AC charging power P is transmitted from the first port 21 to the first auxiliary bridge arm 41. Consequently, the AC charging power P is converted by the first auxiliary bridge arm 41 and the second module 32. Since the AC charging power P cannot be transmitted from the first port 21 to the second auxiliary bridge arm 42, the AC charging power P cannot be converted by the second auxiliary bridge arm 42 and the third module 33. That is, the received power is not converted by the third module 33. Since the second module 32 is connected with the first module 31 in parallel, the received power is converted by the first module 31 and the second module 32. In other words, the output power from the charging device 1 is provided by the first module 31 and the second module 32.

If the current value signal of the AC charging power P is higher than the second current threshold value (e.g., 32 A), the first auxiliary bridge arm 41 is enabled by the second module 32 and the second auxiliary bridge arm 42 is enabled by the third module 33. Meanwhile, the AC charging power P is transmitted from the first port 21 to the first auxiliary bridge arm 41 and the second auxiliary bridge arm 42. Consequently, the AC charging power P is converted by the first module 31, the second module 32, and the third module 33. In other words, the output power from the charging device 1 is provided by the first module 31, the second module 32 and the third module 33.

As mentioned above, the charging device 1 comprises the first auxiliary bridge arm 41 and the second auxiliary bridge arm 42. The first auxiliary bridge arm 41 is connected between the first port 21 and the second module 32. The second auxiliary bridge arm 42 is connected between the first port 21 and the third module 33. In case that the AC charging power P is single-phase, the first module 31 converts the AC charging power P to charge the storage battery. In case that the AC charging power P is three-phase, the first module 31 converts the first phase of the AC charging power. Moreover, the first auxiliary bridge arm 41 is disabled by the second module 32, and the second auxiliary bridge arm 42 is disabled by the third module 33. Consequently, the second module 32 converts the second phase of the AC charging power, and the third module 33 converts the third phase of the AC charging power.

From the above descriptions, the charging device 1 of the present invention is not equipped with the additional portable charger. Regardless of whether the AC charging power P is single-phase or three-phase, the charging device 1 can convert the AC charging power P. Consequently, the electric safety of the charging device 1 is enhanced, and the overall cost of the electric vehicle is reduced. In case that the AC charging power P is single-phase and the output terminals of the first module 31, the second module 32 and the third module 33 are connected with each other in parallel, the first module 31 converts the AC charging power P to charge the storage battery. Moreover, the first auxiliary bridge arm 41 and the second auxiliary bridge arm 42 are selectively enabled or disabled by the second module 32 and the third module 33 according to the current value signal of the AC charging power from the communication module 5. Consequently, the second module 32 and the third module 33 are selectively enabled to convert the AC charging power P. That is, at least one module of the charging device 1 is used for converting the AC charging power P according to the current value signal of the AC charging power. Consequently, the level of the output power from the charging device 1 is selectively varied.

Please refer to FIG. 1 again. The first module 31 comprises a first bridge arm 311 and a second bridge arm 312. The first bridge arm 311 and the second bridge arm 312 are connected with each other in parallel. The first bridge arm 311 comprises an upper switch M11 and a lower switch M12, which are connected with each other in series. The second bridge arm 312 comprises an upper switch M13 and a lower switch M14, which are connected with each other in series. The second module 32 comprises a first bridge arm 321 and a second bridge arm 322. The first bridge arm 321 and the second bridge arm 322 are connected with the first auxiliary bridge arm 41 in parallel. The first bridge arm 321 comprises an upper switch M21 and a lower switch M22, which are connected with each other in series. The second bridge arm 322 comprises an upper switch M23 and a lower switch M24, which are connected with each other in series. The third module 33 comprises a first bridge arm 331 and a second bridge arm 332. The first bridge arm 331 and the second bridge arm 332 are connected with the second auxiliary bridge arm 42 in parallel. The first bridge arm 331 comprises an upper switch M31 and a lower switch M32, which are connected with each other in series. The second bridge arm 332 comprises an upper switch M33 and a lower switch M34, which are connected with each other in series.

The first auxiliary bridge arm 41 comprises two controllable switches M25 and M26, which are connected with each other in series. The second auxiliary bridge arm 42 comprises two controllable switches M35 and M36, which are connected with each other in series. In an embodiment, the upper switch M11 of the first bridge arm 311 of the first module 31, the upper switch M13 of the second bridge arm 312 of the first module 31, the upper switch M21 of the first bridge arm 321 of the second module 32, the upper switch M23 of the second bridge arm 322 of the second module 32, the upper switch M31 of the first bridge arm 331 of the third module 33 and the upper switch M33 of the second bridge arm 332 of the third module 33 are controllable switches. Preferably, the controllable switches are thyristors. Moreover, the lower switch M12 of the first bridge arm 311 of the first module 31, the lower switch M14 of the second bridge arm 312 of the first module 31, the lower switch M22 of the first bridge arm 321 of the second module 32, the lower switch M24 of the second bridge arm 322 of the second module 32, the lower switch M32 of the first bridge arm 331 of the third module 33 and the lower switch M34 of the second bridge arm 332 of the third module 33 are diodes. In this embodiment, the conduction angles of the upper switches M11, M13, M21, M23, M31 and M33 are adjusted. Consequently, the surge currents of the first module 31, the second module 32 and the third module 33 are reduced.

In another embodiment, the lower switch M12 of the first bridge arm 311 of the first module 31, the lower switch M14 of the second bridge arm 312 of the first module 31, the lower switch M22 of the first bridge arm 321 of the second module 32, the lower switch M24 of the second bridge arm 322 of the second module 32, the lower switch M32 of the first bridge arm 331 of the third module 33 and the lower switch M34 of the second bridge arm 332 of the third module 33 are controllable. Preferably, the controllable switches are thyristors. Moreover, the upper switch M11 of the first bridge arm 311 of the first module 31, the upper switch M13 of the second bridge arm 312 of the first module 31, the upper switch M21 of the first bridge arm 321 of the second module 32, the upper switch M23 of the second bridge arm 322 of the second module 32, the upper switch M31 of the first bridge arm 331 of the third module 33 and the upper switch M33 of the second bridge arm 332 of the third module 33 are diodes.

In a further embodiment, the upper switch M11 and the lower switch M12 of the first bridge arm 311 of the first module 31, the upper switch M13 and the lower switch M14 of the second bridge arm 312 of the first module 31, the upper switch M21 and the lower switch M22 of the first bridge arm 321 of the second module 32, the upper switch M23 and the lower switch M24 of the second bridge arm 322 of the second module 32, the upper switch M31 and the lower switch M32 of the first bridge arm 331 of the third module 33 and the upper switch M33 and the lower switch M34 of the second bridge arm 332 of the third module 33 are controllable switches or diodes. Preferably, the controllable switches are thyristors. In some embodiments, the two controllable switches M25 and M26 of the first auxiliary bridge arm 41 and the two controllable switches M35 and M36 of the second auxiliary bridge arm 42 are thyristors.

The first port 21 is connected to a center point O2 between the upper switch M13 and the lower switch M14 of the second bridge arm 312 of the first module 31, a center point O5 between the two controllable switches M25 and M26 of the first auxiliary bridge arm 41 and a center point O8 between the two controllable switches M35 and M36 of the second auxiliary bridge arm 42. The second port 22 is connected to a center point O4 between the upper switch M23 and the lower switch M24 of the second bridge arm 322 of the second module 32. The third port 23 is connected to a center point O7 between the upper switch M33 and the lower switch M34 of the second bridge arm 332 of the third module 33. The neutral line port 24 is connected to a center point O1 between the upper switch M11 and the lower switch M12 of the first bridge arm 311 of the first module 31, a center point O3 between the upper switch M21 and the lower switch M22 of the first bridge arm 321 of the second module 32 and a center point O6 between the upper switch M31 and the lower switch M32 of the first bridge arm 331 of the third module 33.

Each of the first module 31, the second module 32 and the third module 33 further comprises a conversion circuit 6. The input terminal of the conversion circuit 6 of the first module 31 is connected with the first bridge arm 311 of the first module 31 and the second bridge arm 312 of the first module 31. The input terminal of the conversion circuit 6 of the second module 32 is connected with the first bridge arm 321 of the second module 32, the second bridge arm 322 of the second module 32 and the first auxiliary bridge arm 41. The input terminal of the conversion circuit 6 of the third module 33 is connected with the first bridge arm 331 of the third module 33, the second bridge arm 332 of the third module 33 and the second auxiliary bridge arm 42. The output terminal of the conversion circuit 6 of the first module 31, the output terminal of the conversion circuit 6 of the second module 32 and the output terminal of the conversion circuit 6 of the third module 33 are connected with each other in parallel and connected to the output terminal of the charging device 1. Preferably, each of the conversion circuit 6 of the first module 31, the conversion circuit 6 of the second module 32 and the conversion circuit 6 of the third module 33 comprises a power factor correction circuit and a DC/DC converter.

In another embodiment, each of the first module 31, the second module 32 and the third module 33 further comprises a control unit 7. The control unit 7 of the first module 31 is connected with the first port 21 and the neutral line port 24. The control unit 7 of the second module 32 is connected with the first port 21, the second port 22 and the neutral line port 24. The control unit 7 of the third module 33 is connected with the first port 21, the third port 23 and the neutral line port 24. The control unit 7 of the first module 31, the control unit 7 of the second module 32 and the control unit 7 of the third module 33 can judge whether the AC charging power P is single-phase or three-phase. Moreover, the control unit 7 of the first module 31, the control unit 7 of the second module 32 and the control unit 7 of the third module 33 are connected with the communication module 5 to receive the information about the current value signal of the AC charging power P. According to the current value signal of the AC charging power P, the control unit 7 of the second module 32 and the control unit 7 of the third module 33 control the operations of the first auxiliary bridge arm 41 and the second auxiliary bridge arm 42, respectively.

In some embodiments, the communication port 25 further comprises a first communication part 250 and a second communication part 251. The first communication part 250 or the second communication part 251 is used for receiving the current value signal of the AC charging power P. Moreover, the receiving signal of the communication port 25 is transmitted to the communication module 5 in a communication manner.

Figure 2:
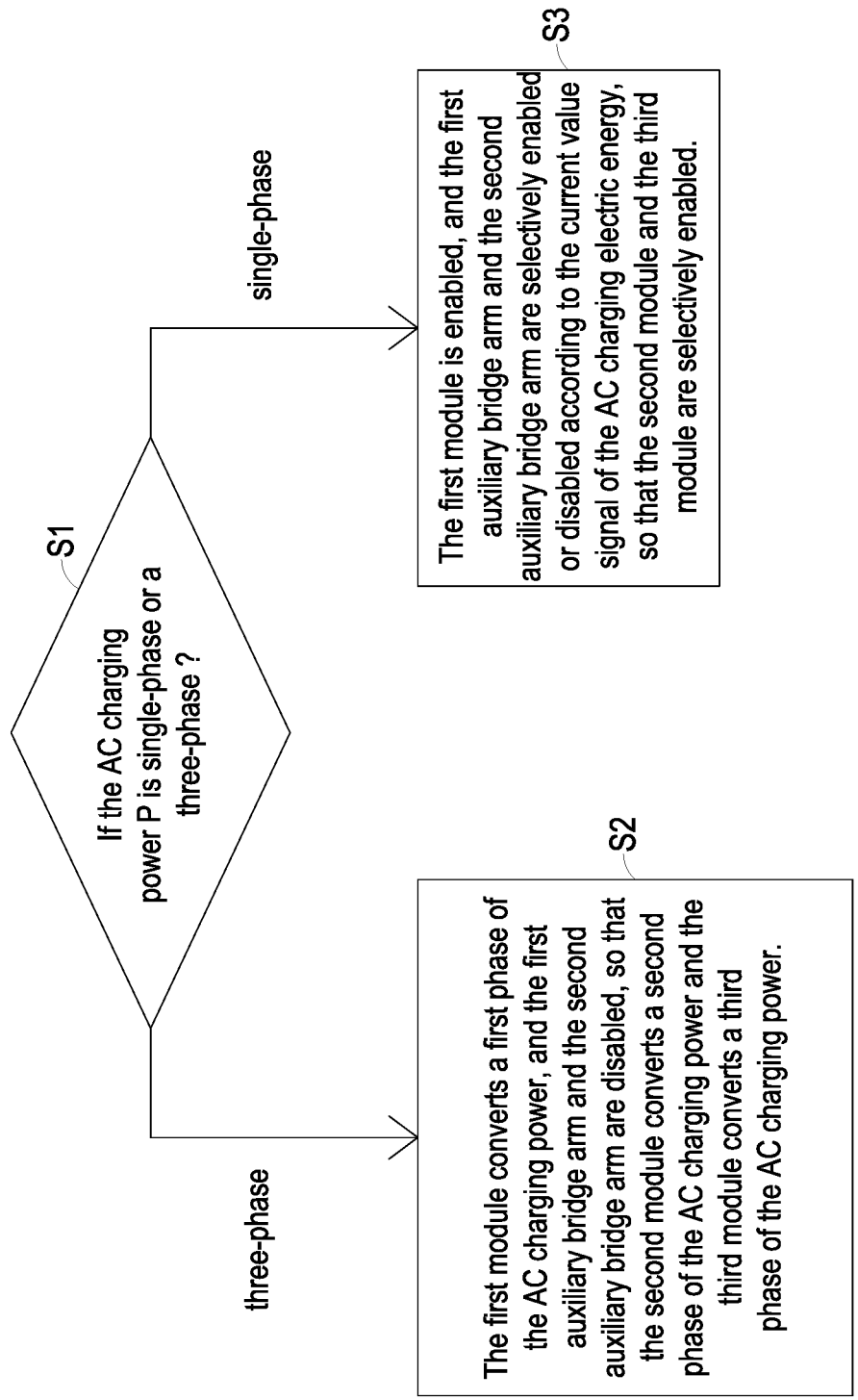
FIG. 2 is a flowchart illustrating a control method for the charging device of FIG. 1.

FIG. 2 is a flowchart illustrating a control method for the charging device of FIG. 1. After an AC charging power P is received, a step S1 is performed to judge whether the AC charging power P is single-phase or three-phase. If the judging result of the step S1 indicates that the AC charging power P is three-phase, a step S2 is performed. In the step S2, the first module 31 converts a first phase of the AC charging power P, and the first auxiliary bridge arm 41 and the second auxiliary bridge arm 42 are disabled, so that the second module 32 converts a second phase of the AC charging power P and the third module 33 converts a third phase of the AC charging power p. If the judging result of the step S1 indicates that the AC charging power P is single-phase, a step S3 is performed. In the step S3, the first module 31 is enabled, and the first auxiliary bridge arm 41 and the second auxiliary bridge arm 42 are selectively enabled or disabled, so that the second module 32 and the third module 33 are selectively enabled. In the step S3, the first auxiliary bridge arm 41 and the second auxiliary bridge arm 42 are selectively enabled or disabled according to the practical requirements and settings. In this embodiment, the output terminals of the first module 31, the second module 32 and the third module 33 are connected with each other in parallel. In the step S3, the first auxiliary bridge arm 41 and the second auxiliary bridge arm 42 are selectively enabled or disabled according to the current value signal of the AC charging power from the communication module 5, so that the second module 32 and the third module 33 are selectively enabled.

Figure 3:
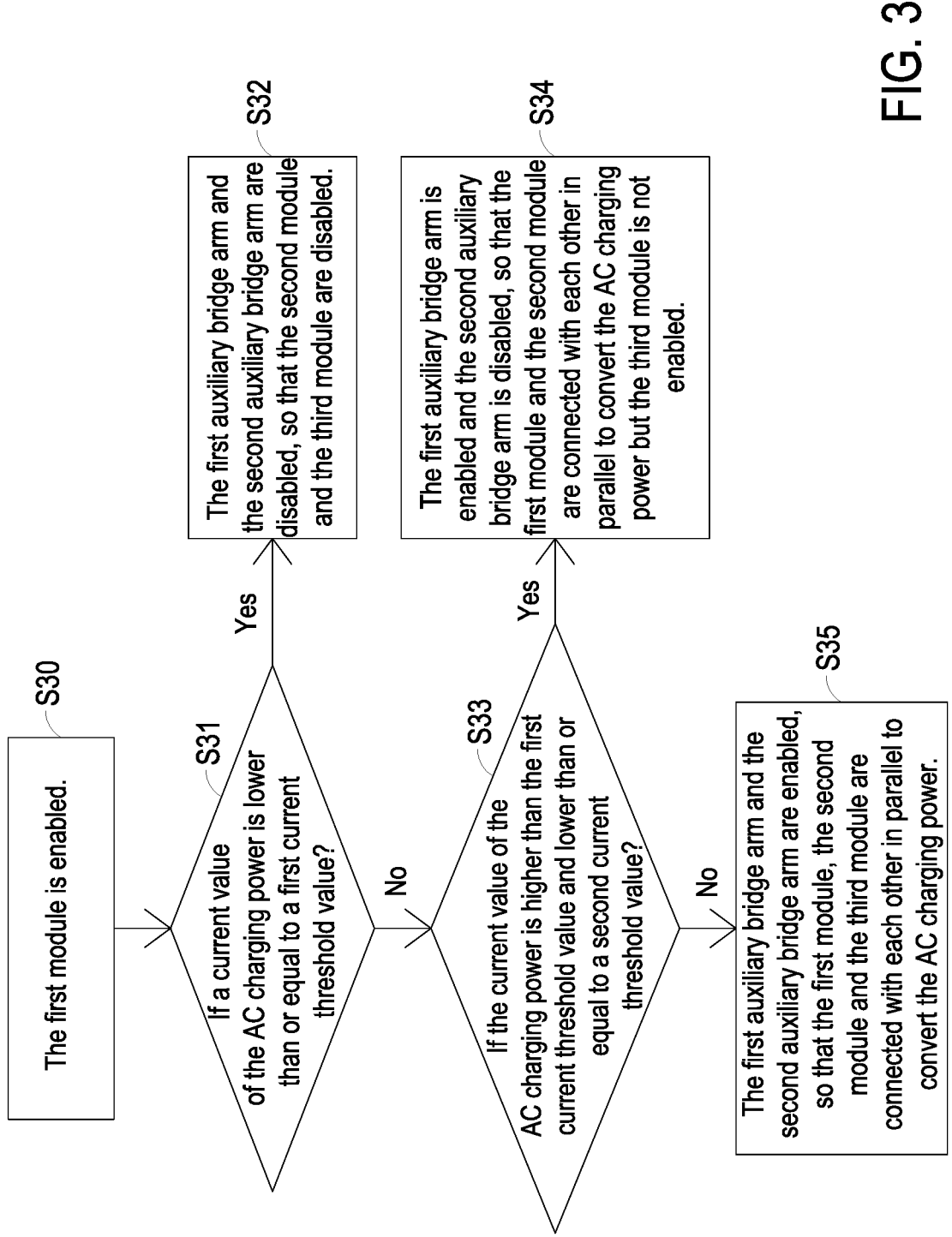
FIG. 3 is a flowchart illustrating the step S3 of the control method of FIG. 2.

FIG. 3 is a flowchart illustrating the step S3 of the control method of FIG. 2. If the output terminals of the first module 31, the second module 32 and the third module 33 are connected with each other in parallel and the judging result of the step S1 indicates that the AC charging power P is single-phase, the first module 31 is enabled (Step S30). Then, a step S31 is performed to judge whether the current value signal of the AC charging power P is lower than or equal to a first current threshold value. If the judging result of the step S31 is satisfied, a step S32 is performed. In the step S32, the first auxiliary bridge arm 41 and the second auxiliary bridge arm 42 are disabled, so that the second module 32 and the third module 33 are disabled. If the judging result of the step S31 is not satisfied, a step S33 is performed to judge whether the current value signal of the AC charging power P is higher than the first current threshold value and the current value signal of the AC charging power P is lower than or equal to a second current threshold value. If the judging condition of the step S33 is satisfied, a step S34 is performed. In the step S34, the first auxiliary bridge arm 41 is enabled and the second auxiliary bridge arm 42 is disabled, so that the first module 31 and the second module 32 are connected with each other in parallel to convert the AC charging power P but the third module 33 is disabled. If the judging condition of the step S33 is not satisfied, a step S35 is performed. In the step S35, the first auxiliary bridge arm 41 and the second auxiliary bridge arm 42 are enabled, so that the first module 31, the second module 32 and the third module 33 are connected with each other in parallel to convert the AC charging power P.

Figure 4:
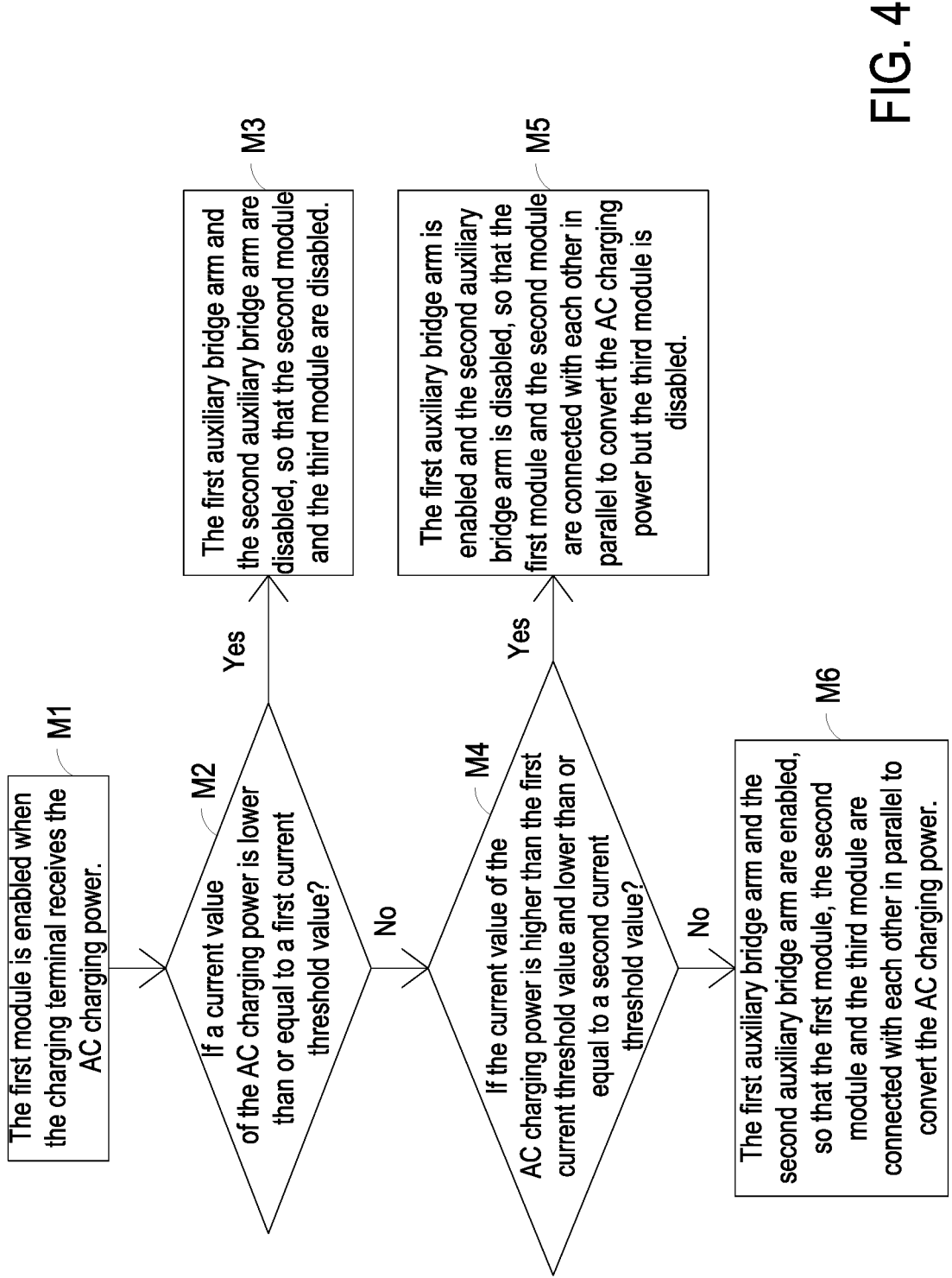
FIG. 4 is a flowchart illustrating another control method for the charging device of FIG. 1, wherein the charging device receives the single-phase power source.

FIG. 4 is a flowchart illustrating another control method for the charging device of FIG. 1. The AC charging power P is single-phase, and the output terminals of the first module 31, the second module 32 and the third module 33 are connected with each other in parallel. Firstly, in a step M1, the charging terminal 2 receives the AC charging power, so that the first module 31 is enabled. Then, a step M2 is performed to judge whether a current value signal of the AC charging power P is lower than or equal to a first current threshold value. If the judging condition of the step M2 is satisfied, a step M3 is performed. In the step M3, the first auxiliary bridge arm 41 and the second auxiliary bridge arm 42 are disabled, so that the second module 32 and the third module 33 are disabled. If the judging condition of the step M2 is not satisfied, a step M4 is performed to judge whether the current value signal of the AC charging power P is higher than the first current threshold value and the current value signal of the AC charging power P is lower than or equal to a second current threshold value. If the judging condition of the step M4 is satisfied, a step M5 is performed. In the step M5, the first auxiliary bridge arm 41 is enabled and the second auxiliary bridge arm 42 is disabled, so that the first module 31 and the second module 32 are connected with each other in parallel to convert the AC charging power P but the third module 33 is disabled. If the judging condition of the step M4 is not satisfied, a step M6 is performed. In the step M6, the first auxiliary bridge arm and the second auxiliary bridge arm are enabled, so that the first module, the second module and the third module are connected with each other in parallel to convert the AC charging power P.

Figure 5:
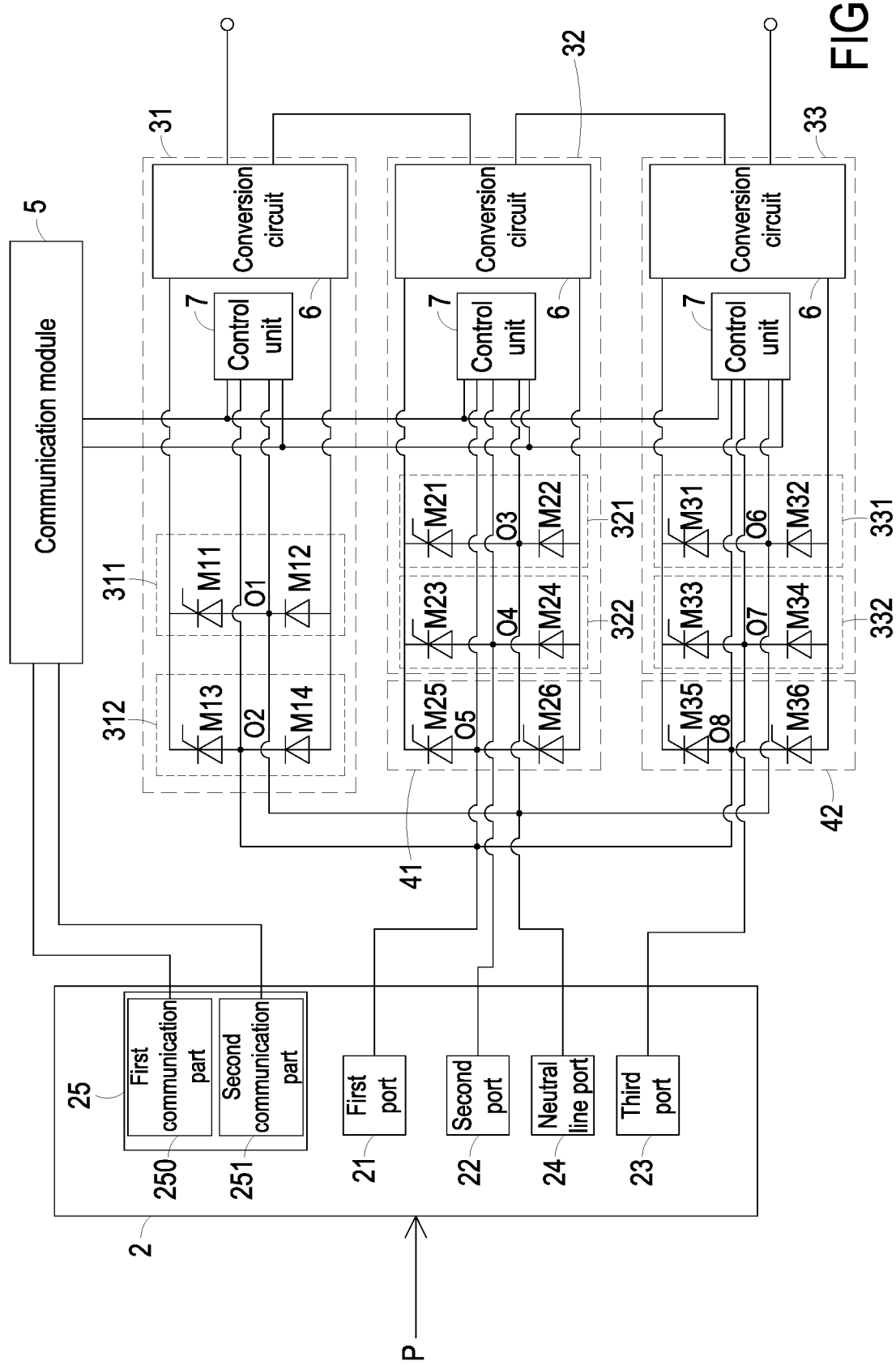
FIG. 5 is a schematic circuit diagram illustrating a charging device according to a second embodiment of the present invention.

FIG. 5 is a schematic circuit diagram illustrating a charging device according to a second embodiment of the present invention. Different from the charging device in FIG. 1, the output terminals of the first module 31, the second module 32 and the third module 33 are connected with each other in series, as shown in FIG. 5. If the AC charging power P received through the first port 21 and the neutral line port 24 of the charging terminal 2 is single-phase, the first auxiliary bridge arm 41 is enabled by the second module 32 and the second auxiliary bridge arm 42 is enabled by the third module 33. Consequently, the first module 31, the second module 32 and the third module 33 are connected with each other in series to convert the AC charging power P. Namely, the output power of the charging device 1 is provided by the first module 31, the second module 32 and the third module 33. The output terminal of the conversion circuit 6 of the first module 31, the output terminal of the conversion circuit 6 of the second module 32 and the output terminal of the conversion circuit 6 of the third module 33 are connected in series and connected to the output terminal of the charging device 1.

In addition, the control method of the charging device 1 of FIG. 5 is similar to the control method of the charging device 1 as shown in FIG. 2. In this embodiment, the output terminals of the first module 31, the second module 32 and the third module 33 are connected with each other in series. Comparing with the control method of the charging device 1 as shown in FIG. 2, the step S3 is different. In the step S3, the first auxiliary bridge arm 41 and the second auxiliary bridge arm 42 are enabled. Consequently, the first module 31, the second module 32 and the third module 33 are connected in series to convert the AC charging power P. The circuit topology of the charging device 1 of FIG. 5 is similar to that of the charging device 1 of FIG. 1, and is not redundantly described herein.

Figure 6:
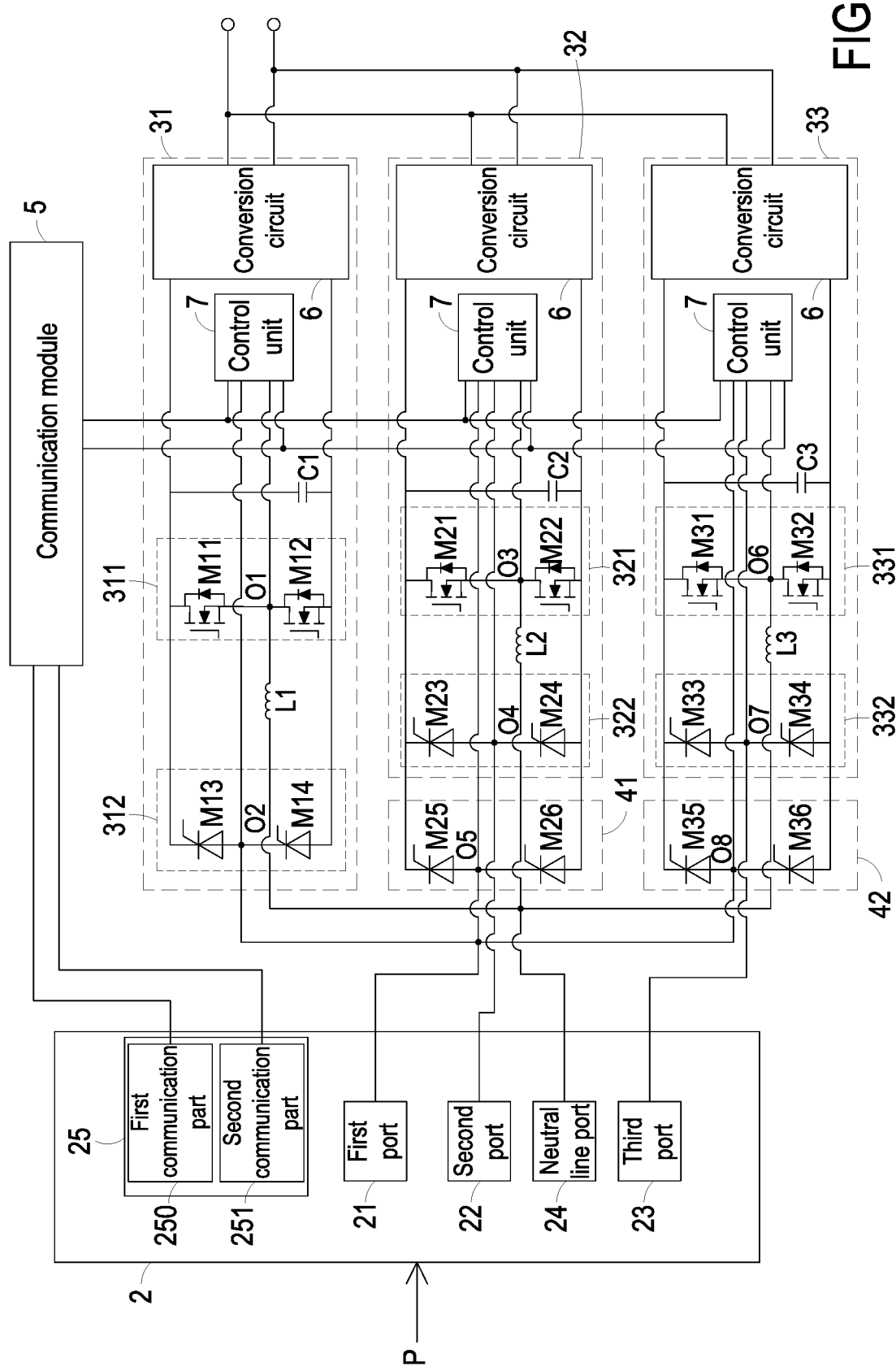
FIG. 6 is a schematic circuit diagram illustrating a charging device according to a third embodiment of the present invention.

FIG. 6 is a schematic circuit diagram illustrating a charging device according to a third embodiment of the present invention. The charging terminal 2, the first module 31, the second module 32, the third module 33, the first auxiliary bridge arm 41, the second auxiliary bridge arm 42 and the communication module 5 of the charging device 1 of FIG. 6 are similar to those of the charging device 1 of FIG. 1. Component parts and elements corresponding to those of the first embodiment are designated by identical numeral references, and detailed descriptions thereof are omitted. In this embodiment, the two switches of the first bridge arm 311 of the first module 31 are transistors, the two switches of the first bridge arm 321 of the second module 32 are transistors, and the two switches of the first bridge arm 331 of the third module 33 are transistors.

Moreover, the first module 31 further includes a capacitor C1 and an inductor L1. The capacitor C1 and the first bridge arm 311 of the first module 31 are connected in parallel. One end of the inductor L1 is connected to a center point O1 between the two switches of the first bridge arm 311 of the first module 31, and the other end of the inductor L1 is connected to the neutral line port 24. The second module 32 further includes a capacitor C2 and an inductor L2. The capacitor C2 and the first bridge arm 321 of the second module 32 are connected in parallel. One end of the inductor L2 is connected to a center point O3 between the two switches of the first bridge arm 321 of the second module 32, and the other end of the inductor L2 is connected to the neutral line port 24. The third module 33 further includes a capacitor C3 and an inductor L3. The capacitor C3 and the first bridge arm 331 of the third module 33 are connected in parallel. One end of the inductor L3 is connected to a center point O6 between the two switches of the first bridge arm 331 of the third module 33, and the other end of the inductor L3 is connected to the neutral line port 24.

As shown in FIG. 6, in this embodiment, the two switches of the first bridge arm 311 of the first module 31, the two switches of the second bridge arm 312 of the first module 31, the capacitor C1 of the first module 31 and the inductor L1 of the first module 31 are configured as a first totem-pole power factor correction circuit. The two switches of the first bridge arm 321 of the second module 32, the capacitor C2 of the second module 32 and the inductor L2 of the second module 32 are configured as a second totem-pole power factor correction circuit. The two switches of the first bridge arm 331 of the third module 33, the capacitor C3 of the third module 33 and the inductor L3 of the third module 33 are configured as a third totem-pole power factor correction circuit. By employing the above-mentioned totem-pole power factor correction circuits, the first module 31, the second module 32 and the third module 33 can includes a single DC-to-DC conversion circuit (not shown) without any additional power factor correction circuit, respectively. Consequently, the charging device 1 of FIG. 6 has reduced components and the cost is reduced. Moreover, the first module 31, the second module 32 and the third module 33 perform the power factor correction by using the respective totem-pole power factor correction circuits. Consequently, the efficiency is enhanced.

Figure 7:
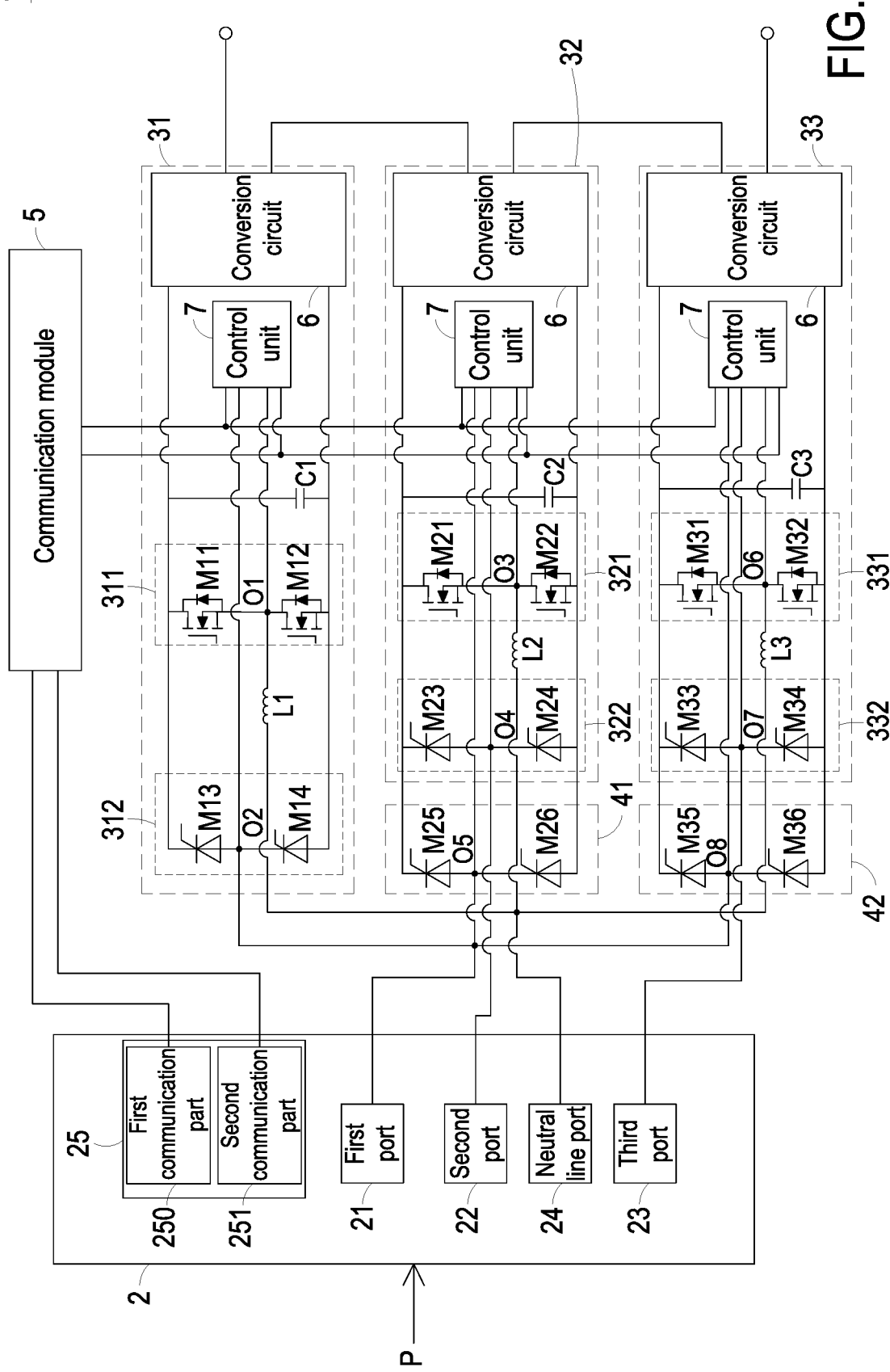
FIG. 7 is a schematic circuit diagram illustrating a charging device according to a fourth embodiment of the present invention.

FIG. 7 is a schematic circuit diagram illustrating a charging device according to a fourth embodiment of the present invention. The output terminals of the first module 31, the second module 32 and the third module 33 are connected with each other in parallel and further connected to the storage battery of the electric vehicle, as shown in FIG. 6. Alternatively, the output terminals of the first module 31, the second module 32 and the third module 33 are connected with each other in series and further connected to the storage battery of the electric vehicle, as shown in FIG. 7. Certainly, the control method as shown in FIGS. 2, 3 and 4 is applicable to the charging device 1 of FIG. 6, and the control method as shown in FIG. 5 is applicable to the charging device 1 of FIG. 7. The detailed descriptions thereof are omitted.

As shown in FIGS. 6 and 7, the two switches of the second bridge arm 312 of the first module 31 are controllable switches, for example thyristors. The two switches of the second bridge arm 322 of the second module 32 are controllable switches, for example thyristors. The two switches of the second bridge arm 332 of the third module 33 are controllable switches, for example thyristors. Alternatively, the two switches of the second bridge arm 312 of the first module 31 are non-controllable switches, for example diodes. The two switches of the second bridge arm 322 of the second module 32 are non-controllable switches, for example diodes. The two switches of the second bridge arm 332 of the third module 33 are non-controllable switches, for example diodes.

From the above descriptions, the present invention provides the charging device. The charging device comprises the first auxiliary bridge arm and the second auxiliary bridge arm. The first auxiliary bridge arm is connected between the first port and the second module. The second auxiliary bridge arm is connected between the first port and the third module. If the AC charging power is three-phase, the first module is enabled to convert a first phase of the AC charging power, and the first auxiliary bridge arm and the second auxiliary bridge arm are disabled by the second module and the third module. Consequently, the second module converts a second phase of the AC charging power, and the third module converts a third phase of the AC charging power. If the AC charging power is single-phase, the charging device at least uses the first module to convert the AC charging power and charge the storage battery. In accordance with a feature of the present invention, the charging device is not equipped with the additional portable charger. Regardless of whether the AC charging power is single-phase or three-phase, the charging device can convert the AC charging power. Consequently, the electric safety of the charging device is enhanced, and the overall cost of the electric vehicle is reduced.

In case that the AC charging power P is single-phase and the output terminals of the first module 31, the second module 32 and the third module 33 are connected with each other in parallel, the first module converts the AC charging power P to charge the storage battery. Moreover, the first auxiliary bridge arm and the second auxiliary bridge arm are selectively enabled or disabled by the second module and the third module according to the current value signal of the AC charging power. Consequently, the second module and the third module are selectively enabled to convert the AC charging power. That is, at least one module of the charging device is used for converting the AC charging power according to the current value signal of the AC charging power. Consequently, the level of the output power from the charging device is selectively varied.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charging device receiving an AC charging power from a charging apparatus and converting the AC charging power to a load, the charging device comprising:
   a charging terminal comprising a first port, a second port, a third port, a neutral line port and a communication port, wherein if the AC charging power is single-phase, the charging terminal receives the AC charging power through the first port and the neutral line port, wherein if the AC charging power is three-phase, the charging terminal receives a first phase, a second phase and a third phase of the AC charging power through the first port, the second port and the third port, respectively;
   a first module connected with the first port and the neutral line port;
   a second module connected with the second port and the neutral line port;
   a third module connected with the third port and the neutral line port, wherein an output terminal of the first module, an output terminal of the second module and an output terminal of the third module are connected with each other, and the first module, the second module and the third module judge whether the AC charging power is single-phase or three-phase;
   a first auxiliary bridge arm connected between the first port and the second module;
   a second auxiliary bridge arm connected between the first port and the third module; and
   a communication module connected to the charging terminal, the first module, the second module and the third module, for receiving a charging signal of the AC charging power and transmitting an information about the charging signal to the first module, the second module and the third module, wherein according to the charging signal, the second module and the third module control operations of the first auxiliary bridge arm and the second auxiliary bridge arm.

2. The charging device according to claim 1, wherein if the AC charging power is three-phase, the first module is enabled to convert the first phase, and the first auxiliary bridge arm and the second auxiliary bridge arm are disabled by the second module and the third module, so that the second module converts the second phase and the third module converts the third phase.

3. The charging device according to claim 1, wherein if the AC charging power is single-phase and the output terminals of the first module, the second module and the third module are connected with each other in parallel, the first module is enabled to convert the AC charging power, and the first auxiliary bridge arm and the second auxiliary bridge arm are selectively enabled or disabled by the second module and the third module according to the charging signal of the AC charging power, so that the second module and the third module are selectively enabled to convert the AC charging power.

4. The charging device according to claim 1, wherein the communication port further comprises a first communication part and a second communication part, wherein the charging signal is received by the first communication part or the second communication part and the information about the charging signal is transmitted to the communication module in a communication manner.

5. The charging device according to claim 1, wherein the charging signal comprise a current value signal.

6. The charging device according to claim 5, wherein if the AC charging power is single-phase, the output terminals of the first module, the second module and the third module are connected with each other in parallel and the current value signal of the AC charging power is lower than or equal to a first current threshold value, the first auxiliary bridge arm is disabled by the second module and the second auxiliary bridge arm is disabled by the third module, so that the AC charging power is converted by the first module.

7. The charging device according to claim 5, wherein if the AC charging power is single-phase, the output terminals of the first module, the second module and the third module are connected with each other in parallel and the current value signal of the AC charging power is higher than a first current threshold value and lower than or equal to a second current threshold value, the first auxiliary bridge arm is enabled by the second module and the second auxiliary bridge arm is disabled by the third module, so that the AC charging power is converted by the first module and the second module connected in parallel.

8. The charging device according to claim 5, wherein if the AC charging power is single-phase, the output terminals of the first module, the second module and the third module are connected with each other in parallel and the current value signal of the AC charging power is higher than a second current threshold value, the first auxiliary bridge arm is enabled by the second module and the second auxiliary bridge arm is enabled by the third module, so that the AC charging power is converted by the first module, the second module and the third module connected in parallel.

9. The charging device according to claim 1, wherein each of the first module, the second module and the third module comprises a first bridge arm and a second bridge arm, wherein each of the first bridge arm and the second bridge arm comprises an upper switch and a lower switch, which are connected with each other in series, wherein each of the first auxiliary bridge arm and the second auxiliary bridge arm comprises two controllable switches, which are connected with each other in series.

10. The charging device according to claim 9, wherein the upper switch is a controllable switch.

11. The charging device according to claim 9, wherein the lower switch is a controllable switch.

12. The charging device according to claim 9, wherein the two switches of the first bridge arm of the first module, the two switched of the first bridge arm of the second module and the two switches of the first bridge arm of the third module are transistors, respectively, wherein each of the first module, the second module and the third module comprises a capacitor and an inductor, wherein each of the capacitor and corresponding first bridge arm are connected in parallel, and each of the inductor has one end connected to a center point between the two switches of the corresponding first bridge arm and the other end connected to the neutral line port.

13. The charging device according to claim 1, wherein the first module further comprises a first conversion circuit, the second module further comprises a second conversion circuit, and the third module further comprises a third conversion circuit, wherein an input terminal of the first conversion circuit is connected with the first bridge arm of the first module and the second bridge arm of the first module, an input terminal of the second conversion circuit is connected with the first bridge arm of the second module, the second bridge arm of the second module and the first auxiliary bridge arm, and an input terminal of the third conversion circuit of the third module is connected with the first bridge arm of the third module, the second bridge arm of the third module and the second auxiliary bridge arm, wherein an output terminal of the first conversion circuit, an output terminal of the second conversion circuit and an output terminal of the third conversion circuit are connected with each other.

14. The charging device according to claim 1, wherein the first module further comprises a first control unit, the second module further comprises a second control unit, and the third module further comprises a third control unit, wherein the first control unit is connected with the communication module, the first port and the neutral line port, the second control unit is connected with the communication module, the first port, the second port and the neutral line port, and the third control unit is connected with the communication module, the first port, the third port and the neutral line port, wherein the first control unit, the second control unit and the third control unit judge whether the AC charging power is single-phase or three-phase, and the first auxiliary bridge arm and the second auxiliary bridge arm are selectively enabled or disabled by the second control unit and the third control unit according to the charging signal of the AC charging power.

15. The charging device according to claim 1, wherein if the AC charging power is single-phase and the output terminals of the first module, the second module and the third module are connected with each other in series, the first auxiliary bridge arm and the second auxiliary bridge arm are enabled by the second module and the third module, and the first module, the second module and the third module are enabled to convert the AC charging power.

16. A control method for a charging device, the charging device receiving an AC charging power from a charging apparatus and converting the AC charging power to a load, the charging device comprising a charging terminal, a first module, a second module, a third module, a first auxiliary bridge arm and a second auxiliary bridge arm, the charging terminal comprising a first port, a second port and a third port, the first module being connected with the first port, the second module being connected with the second port, the third module being connected with the third port, the first auxiliary bridge arm being connected between the first port and the second module, the second auxiliary bridge arm being connected between the first port and the third module, an output terminal of the first module, an output terminal of the second module and an output terminal of the third module being connected with each other, the control method comprising steps of:

(a) receiving the AC charging power, and judging whether the AC charging power is single-phase or three-phase, wherein if the AC charging power is three-phase, a step (b) is performed, wherein if the AC charging power is single-phase, a step (c) is performed;

(b) allowing the first module to convert a first phase of the AC charging power, and disabling the first auxiliary bridge arm and the second auxiliary bridge arm, so that the second module converts a second phase of the AC charging power and the third module converts a third phase of the AC charging power; and (c) enabling the first module, and selectively enabling or disabling the first auxiliary bridge arm and the second auxiliary bridge arm, so that the second module and the third module are selectively enabled.

17. The control method according to claim 16, wherein the output terminals of the first module, the second module and the third module are connected with each other in parallel, wherein in the step (c), selectively enabling or disabling the first auxiliary bridge arm and the second auxiliary bridge arm according to a charging signal of the AC charging power, so that the second module and the third module are selectively enabled.

18. The control method according to claim 17, wherein the charging signal comprise a current value signal.

19. The control method according to claim 16, wherein the output terminals of the first module, the second module and the third module are connected with each other in series, wherein in the step (c), enabling the first auxiliary bridge arm and the second auxiliary bridge arm, and the first module, the second module and the third module are enabled.

20. The control method according to claim 18, wherein the step (c) comprises steps of:

(c1) enabling the first module;

(c2) judging whether the current value signal of the AC charging power is lower than or equal to a first current threshold value, wherein if the current value signal of the AC charging power is lower than or equal to the first current threshold value, a step (c3) is performed, wherein if the current value signal of the AC charging power is higher than the first current threshold value, a step (c4) is performed;

(c3) disabling the first auxiliary bridge arm and the second auxiliary bridge arm, so that the second module and the third module are disabled;

(c4) judging whether the current value signal of the AC charging power is higher than the first current threshold value and lower than or equal to a second current threshold value, wherein if the current value signal of the AC charging power is higher than the first current threshold value and lower than or equal to the second current threshold value, a step (c5) is performed, wherein if the current value signal of the AC charging power is higher than the second current threshold value, a step (c6) is performed;
(c5) enabling the first auxiliary bridge arm and disabling the second auxiliary bridge arm, so that the first module and the second module are connected with each other in parallel to convert the AC charging power but the third module is disabled; and
(c6) enabling the first auxiliary bridge arm and the second auxiliary bridge arm, so that the first module, the second module and the third module are connected with each other in parallel to convert the AC charging power.

21. A control method for a charging device, the charging device receiving a single-phase AC charging power from a charging apparatus, the charging device comprising a charging terminal, a first module, a second module, a third module, a first auxiliary bridge arm and a second auxiliary bridge arm, the charging terminal comprising a first port and a neutral line port, the first module, the second module and the third module being connected with the first port and the neutral line port, the first auxiliary bridge arm being connected between the charging terminal and the second module, the second auxiliary bridge arm being connected between the charging terminal and the third module, an output terminal of the first module, an output terminal of the second module and an output terminal of the third module being connected with each other in parallel, the control method comprising steps of:
(a) enabling the first module when the charging terminal receives the single-phase AC charging power;
(b) judging whether a current value signal of the single-phase AC charging power is lower than or equal to a first current threshold value, wherein if the current value signal is lower than or equal to the first current threshold value, a step (c) is performed, wherein if the current value signal is higher than the first current threshold value, a step (d) is performed;
(c) disabling the first auxiliary bridge arm and the second auxiliary bridge arm, so that the second module and the third module are disabled;
(d) judging whether the current value signal is higher than the first current threshold value and lower than or equal to a second current threshold value, wherein if the current value signal is higher than the first current threshold value and lower than or equal to the second current threshold value, a step (e) is performed, wherein if the current value signal is higher than the second current threshold value, a step (f) is performed;
(e) enabling the first auxiliary bridge arm and disabling the second auxiliary bridge arm, so that the first module and the second module are connected with each other in parallel to convert the single-phase AC charging power but the third module is disabled; and
(f) enabling the first auxiliary bridge arm and the second auxiliary bridge arm, so that the first module, the second module and the third module are connected with each other in parallel to convert the single-phase AC charging power.

* * * * *